UNITED STATES PATENT OFFICE.

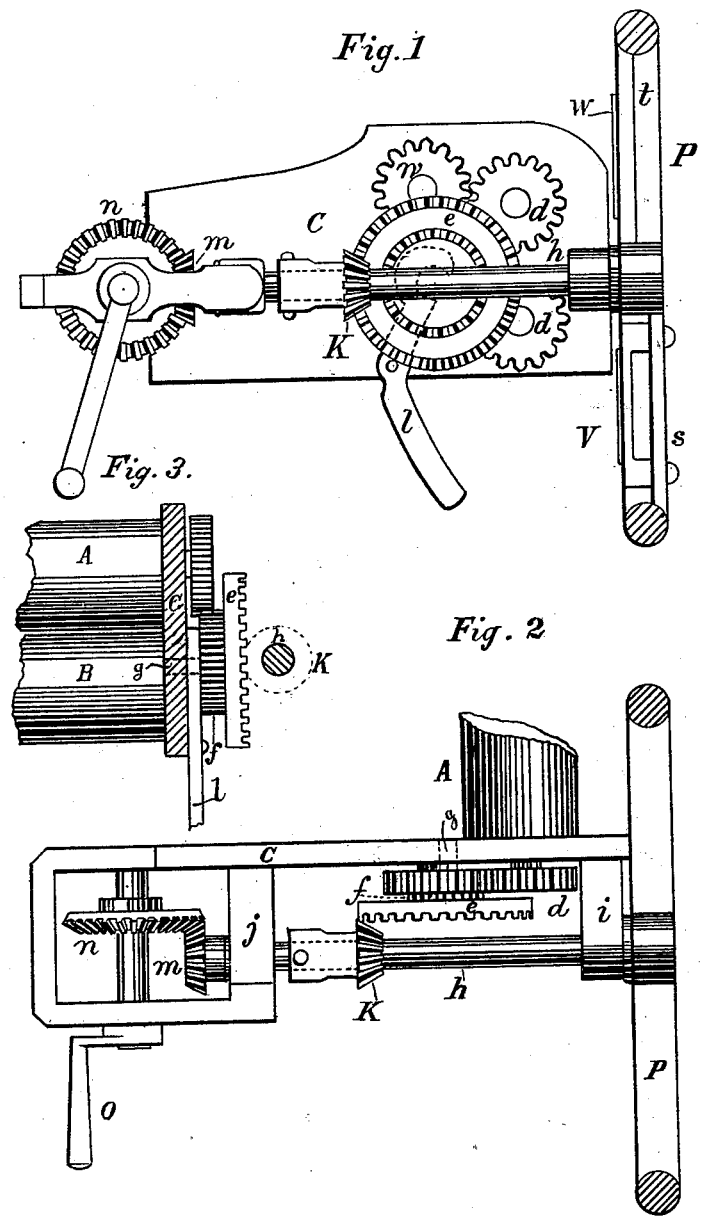

JOHN WEICHHART, OF SAN FRANCISCO, CALIFORNIA.

GEARING MECHANISM FOR STRAW-CUTTERS.

SPECIFICATION forming part of Letters Patent No. 225,671, dated March 16, 1880.

Application filed January 10, 1879.

*To all whom it may concern:*

Be it known that I, JOHN WEICHHART, of the city and county of San Francisco, and State of California, have invented an Improved Gearing Mechanism for Straw-Cutters; and I do hereby declare that the following is a full, clear, and exact description thereof, reference being had to the drawings accompanying this specification, and forming a part of the same.

My invention has reference to certain improvements on the straw-cutter for which Letters Patent No. 72,249 were issued to me on the 17th day of December, 1867.

My improvement consists of the combination, with the cutter-shaft having a sliding pinion and a separate pinion gearing with the driving-pinion, of a toothed hub, a wheel with concentric circles of cogs or teeth, feed-rolls with meshing pinions, and a shifting-lever, substantially as hereinafter more fully set forth.

Referring to the accompanying drawings, Figure 1 is a side view, showing knives on the wheel. Fig. 2 is a plan view. Fig. 3 is a detached view of feed-roller mechanism.

A B are the two feed-rollers, which pass across the forward end of the feed-box, and between which the straw is fed forward to the cutter or cutters. These rollers are supported by journals which pass through the sides of the box.

In the present instance I have represented the gearing which I use to drive these rollers as being attached to a plate, C, which plate is fastened to the outside of the box near its forward end. The supporting-journals of the rollers A B pass through this plate, and have each a pinion, *d*, secured to it outside of the plate. To drive these pinions I use a wheel, *e*, which has a toothed hub, *f*, on one side of it.

A post or short fixed shaft, *g*, projects from the plate in the proper position to allow the toothed hub *f* to engage with the lower pinion *d* when the wheel *e* is slipped down over it. This toothed hub is connected with the other pinion *d* by an intermediate gear, *w*, so as to change the direction of motion and drive both rollers in the same direction. The wheel *e* has two circles of teeth or cogs on its outer face, one near the center and the other on its outer rim, so that practically it forms two toothed wheels of different diameters.

A shaft, *h*, is supported in standards *i j*, so as to pass directly over the center of this wheel, and on this shaft is a pinion, K, which can be slipped on the shaft like a sleeve and fastened at either of two points, so as to cause it to engage with either of the circles of cogs on the wheel *e*. After the pinion K is set the wheel *e* is raised into engagement with it by drawing the wheel *e* outward on its post or shaft and inserting a block under it. For convenience I use a lever, *l*, one end of which can be moved under the wheel when it is lifted into engagement with the pinion, while its other end serves as a handle to move it by.

The shaft *h* has a bevel-pinion, *m*, on its rear end, which engages with a bevel-wheel, *n*, on the driving-crank O, by means of which it is driven. The forward end of the shaft *h* projects in advance of the front end of the cutting-box, and has the cutting fly-wheel P secured to it, so as to cut across the end of the box, as described in my former patent.

Instead of making two circles of teeth, I might make continuous radial teeth, so that the pinion could be adjusted to any point between the center and circumference of the wheel, thus giving any desired speed.

By this arrangement of gears I am able to run the feed-rollers at a slow or fast speed without changing the speed of the shaft that carries the knives or cutters, so that I can cut the straw longer or shorter, according to the adjustment of the gears—that is, the arrangement above described will give me two speeds of feed-rollers from the same speed of the shaft *h*; but by employing a wheel like *e*, instead of the bevel-wheel *n*, on the crank-shaft, and arranging the pinion *m* so that it can be engaged with either, I can get four different speeds for the rollers from the same speed of the shaft *h*.

I have also arranged the cutting or fly wheel P so that I can use either one cutter or two cutters without interfering with the feeding of the straw. To do this I make the wheel with one spoke, *t*, on the inside of which the ordinary fixed cutting-knife is secured, while the spoke *s* on the opposite side of the hub is made on the outside of the wheel. The knife or cutter V, which I use on this outside spoke, s, is made wide enough to reach across the space and bring its cutting-edge in the same plane with that of the fixed cutting-blade.

When it is desired to use only a single cutting-blade I remove the wide blade, and the space between the end of the box and the outer spoke, to which the blade was attached, is sufficient to prevent the spoke from interfering with the cutting operation of the single cutter.

By means of these several devices I can set the machine to cut long or short feed with a fast or slow motion, without changing the speed of the main driving-shaft or cutting-wheel, thus greatly improving upon my former device. Besides this advantage, the mechanism is greatly simplified and its cost reduced.

Having thus described my invention, what I claim, and desire to secure by Letters Patent, is—

In a straw-cutter, the combination, with the cutter-shaft $h$, having the sliding pinion K, and pinion $m$, gearing with the driving-pinion $n$, of the toothed hub $f$, wheel $e$, with concentric circles of cogs or teeth, feed-rolls A B, pinions $w$ $d$, and shifting-lever $l$, substantially as and for the purpose set forth.

In witness whereof I hereunto attach my hand.

JOHN WEICHHART.

Witnesses:
  JNO. L. BOONE,
  LÉON SIRICEX.